US012744811B2

(12) United States Patent
Li et al.

(10) Patent No.: US 12,744,811 B2
(45) Date of Patent: Sep. 22, 2026

(54) ANOMALY DETECTION-BASED ATTENTION PURIFICATION GRAPH DEFENSE METHOD

(71) Applicant: Hangzhou Dianzi University, Hangzhou City (CN)

(72) Inventors: Youhuizi Li, Hangzhou City (CN); Yuyu Yin, Hangzhou City (CN); Yi Wang, Hangzhou City (CN); Tingting Liang, Hangzhou City (CN); Yu Li, Hangzhou City (CN)

(73) Assignee: Hangzhou Dianzi University, Hangzhou City (CN)

( * ) Notice: Subject to any disclaimer, the term of this patent is extended or adjusted under 35 U.S.C. 154(b) by 17 days.

(21) Appl. No.: 18/943,016

(22) Filed: Nov. 11, 2024

(65) Prior Publication Data

US 2025/0175492 A1 May 29, 2025

(30) Foreign Application Priority Data

Nov. 24, 2023 (CN) ......................... 202311576305.2

(51) Int. Cl.
*H04L 9/40* (2022.01)
*G06N 3/094* (2023.01)

(52) U.S. Cl.
CPC ......... *H04L 63/1441* (2013.01); *G06N 3/094* (2023.01)

(58) Field of Classification Search
CPC ..... H04L 63/1441; G06F 21/50; G06F 21/64; G06N 3/0464
See application file for complete search history.

(56) References Cited

U.S. PATENT DOCUMENTS

| | | | | |
|---|---|---|---|---|
| 11,606,389 | B2 * | 3/2023 | Chen | G06N 3/08 |
| 12,182,256 | B1 * | 12/2024 | Xie | G06F 21/55 |
| 2022/0392056 | A1 * | 12/2022 | Sawal | G06N 3/0464 |
| 2023/0090205 | A1 * | 3/2023 | Yehezkel | H04L 63/1425 726/23 |

* cited by examiner

*Primary Examiner* — Thaddeus J Plecha
(74) *Attorney, Agent, or Firm* — Thomas | Horstemeyer, LLP

(57) ABSTRACT

An anomaly detection-based attention purification graph defense method is provided, which includes: Step 1: selecting an anomaly detection algorithm, passing an input graph into an anomaly detection module, and obtaining potential abnormal edges, wherein the obtained result is specifically a two-dimensional matrix named linkpred; Step 2: passing the linkpred matrix obtained in Step 1 and other required training parameters into an ADGAT model for training, and purifying an attention layer in the training process by linkpred; Step 3: using the trained model to generate graph node features to complete a specific downstream graph task. In the downstream graph task with high security requirements, the method can enhance the robustness of the model on the premise of defending the inherent noise and malicious disturbance in graph data and ensuring the performance of GNNs.

7 Claims, 3 Drawing Sheets

ANOMALY DETECTION-BASED ATTENTION PURIFICATION GRAPH DEFENSE METHOD

CROSS-REFERENCE TO RELATED APPLICATION

This patent application claims priority to Chinese Patent Application No. 202311576305.2, filed on Nov. 24, 2023, which is hereby incorporated by reference in its entirety.

TECHNICAL FIELD

The present disclosure relates to the field of graph neural network adversarial learning, in particular to an anomaly detection-based attention purification graph defense method.

BACKGROUND

With the increasing complexity of the real environment, the graph data structure is used more and more frequently. A graph can be used to describe complex scenarios with multiple entities and multiple relationships. For example, in the fields of finance (transaction networks), chemical medicine (molecular graphs), transportation (road maps), and recommendation (relationship networks), graph data is becoming more and more popular. In various fields, common graph tasks include node classification, link prediction, graph classification, etc.

In recent years, with the rapid development of deep learning, graph neural networks (GNNs) are widely regarded as a powerful tool for graph representation learning, and have made impressive achievements in many graph tasks. For graph data in different fields, the mainstream GNNs follow the message-passing mechanism and aggregates the features of neighboring nodes according to the structure information of the graph to obtain the feature vector of the current node. Finally, a series of downstream graph tasks are completed through the learned node features. However, though the results achieved by the GNNs are exciting, the message-passing mechanism basically depends on the structure information of the graph data, in other words, the quality of the graph data structure will have a great impact on the task results. Because of the complexity of the graph data, graphs in real environment are not high-quality graphs in most cases, and there are inherent noises and human malicious disturbances in the structure, which will greatly affect the performance of the GNNs. In addition, the original graph structure may not be the optimal structure for solving graph tasks.

Related studies show that the GNNs are vulnerable to malicious disturbance well-designed for the graph structure, that is, adversarial attacks. Most adversarial attacks will modify the original graph structure and focus on deleting original edges and adding malicious edges, which will greatly degrade the performance of the GNNs, thus deceiving the prediction of the GNNs on the downstream tasks. For example, in the recommendation task, maliciously adding a false “product-user edge” in the product-user network will lead to users being exposed to products that they are not interested in and affect the user experience. In addition, the robustness and anti-disturbance ability of the GNNs model have attracted more and more attention in the graph task field where security is particularly important, such as finance and medical care. Therefore, it is of great significance to develop a robust graph defense strategy.

SUMMARY

The present disclosure provides an anomaly detection-based attention purification graph defense method, aiming at enhancing the robustness of the model on the premise of defending the inherent noise and malicious disturbance in graph data and ensuring the performance of GNNs in the downstream graph task with high security requirements.

Anomaly detection is to mine the potential abnormal nodes and abnormal edges in graph data based on a specific detection algorithm or model. According to the present disclosure, the potential abnormal edges are obtained based on the anomaly detection module, the attention coefficient in the message-passing process of the ADGAT model is purified, and the robustness of the model is enhanced to defend adversarial attacks.

The present disclosure provides an anomaly detection-based attention purification graph defense method, which includes the following steps:

Step 1, selecting an anomaly detection algorithm, passing graph data into an anomaly detection module, and obtaining potential abnormal edges, wherein the obtained result is specifically a matrix named linkpred;

Step 2, passing a linkpred matrix obtained in Step 1 and other required training parameters into an ADGAT model for training, and purifying an attention layer in the training process by linkpred;

Step 3, using the trained graph neural network model to generate hidden layer features to complete a specific downstream graph task.

Preferably, the anomaly detection algorithm includes the following steps:

sub-step 1-1, in the present disclosure, using a graph link prediction model as an anomaly detector to realize the function of the anomaly detection module, in which the VGAE is selected as the graph link prediction model;

sub-step 1-2: passing feature matrix and adjacency matrix of the graph data into the graph link prediction model for independent training after being preprocessed, such as format conversion and normalization, and obtaining an anomaly detector AD after the training;

sub-step 1-3, performing global prediction on the graph data by using the anomaly detector AD to obtain a linkpred matrix with the shape of (N, N), where N is the number of nodes of the graph data; and inputting the linkpred matrix into a sigmoid function for normalization, and scaling element values of the matrix to an interval of [0, 1] as detection probability.

Preferably, the ADGAT model training process includes the following steps:

sub-step 2-1: preprocessing the feature matrix and the adjacency matrix of the graph data to obtain feature and adj, obtaining the linkpred matrix from Step 1, and passing the linkpred matrix, feature and adj into the ADGAT model together;

sub-step 2-2: in the training process, according to the detection probability in the linkpred matrix, dividing three edge clusters $\{Edge_1, Edge_2, Edge_3\}$, and performing an attention enhancing operation and an attention weakening operation for different edge clusters;

sub-step 2-3, passing a message based on a purified attention coefficient, aggregating the features of adjacent nodes by a multi-head attention mechanism, and iterating hidden layer features of current node.

Preferably, the three edge clusters {$Edge_1$, $Edge_2$, $Edge_3$} divided by the anomaly detection module include: a low confidence edge set, a common confidence edge set and a high confidence edge set;

the low confidence edge set includes the edges whose detection probability of $linkpred_{ij}$ is lower than 0.8, which are regarded as potential abnormal edges;

the common confidence edge set includes the edges whose detection probability of $linkpred_{ij}$ is between 0.8 and 0.9, which are regarded as normal edges;

the high confidence edge set includes the edges whose detection probability of $linkpred_{ij}$ is higher than 0.9, which are regarded as clean edges.

Preferably, an attention purification mechanism in the model training is expressed as a formula:

$$e_{ij}=a(W\vec{h}_i,W\vec{h}_j);$$

where $e_{ij}$ denotes an attention coefficient of node i to node j, h is a hidden layer feature, and W is a weight matrix, which is used for the linear change of the hidden layer feature h.

The final weight coefficient $\alpha_{ij}$ the attention mechanism calculated based on $e_{ij}$ is as follows:

$$\alpha_{ij}=\frac{\exp\left(\mathrm{Leaky}ReLU\left(\vec{a}^T\left[W\vec{h}_i\middle\|W\vec{h}_j\right]\right)\right)}{\sum_{k\in N_i}\exp\left(\mathrm{Leaky}ReLU\left(\vec{a}^T\left[W\vec{h}_i\middle\|W\vec{h}_j\right]\right)\right)};$$

where a nonlinear activation function LeakyReLU (negative slope $\alpha$=0.2) is used to activate $e_{ij}$, and the activated value is input into a softmax function to standardize the weight coefficient $\alpha_{ij}$.

The process of performing attention purification based on the linkpred matrix is expressed as a formula:

$$\begin{cases}\alpha_{ij}=\mathrm{attention\_increase}(\alpha_{ij}) & E_{ij}\in\mathrm{Edge}_1\\ \alpha_{ij}=\mathrm{attention\_norm}(\alpha_{ij}) & E_{ij}\in\mathrm{Edge}_2\\ \alpha_{ij}=\mathrm{attention\_decrease}(\alpha_{ij}) & E_{ij}\in\mathrm{Edge}_3\end{cases};$$

where the attention of the low confidence edge set is decreased; the common confidence edge set is not processed; and the original attention coefficient is maintained; and the attention of the high confidence edge set is increased.

The final iteration formula of the hidden layer features is as follows:

$$\vec{h}_i'=Concat\left(\sigma\left(\sum_{j\in N_i}\alpha_{ij}^kW^k\vec{h}_j\right)\right);$$

where $\sigma$ is the activation function for nonlinear transformation; K is the number of attention heads of multi-head attention, and Concat(•) is a splicing function of K attention heads; $W^k$ is the linear transformation weight matrix of the corresponding input.

The present disclosure has the following substantive features: the idea of graph purification is integrated with graph anomaly detection, the structure information of graph data is optimized by using the anomaly detection result, malicious attacks of disturbed edges are decreased, the influence of clean edges on the results is enhanced, and the robustness and defense performance of GNNs are improved. Compared with other similar defense models, ADGAT is more excellent in robustness and defense ability while maintaining good performance. Through the global attack method (metattck), the graph data such as cora and citeseer is attacked with different disturbance rates. The model has higher prediction accuracy in the node classification task than that of other similar defense models, and has achieved an excellent result especially on the heavily disturbed graph (ptb=25%). Comprehensive analysis shows that the method provided by the present disclosure has the features of high accuracy and excellent model robustness and defense performance.

DETAILED DESCRIPTION OF THE EMBODIMENTS

The method of the present disclosure will be further explained in detail through specific embodiments and the attached drawings.

The present disclosure provides an anomaly detection-based attention purification graph defense method, aiming at enhancing the robustness of the model on the premise of defending the inherent noise and malicious disturbance in graph data and ensuring the performance of GNNs in the downstream graph task with high security requirements. Specific symbols in the present disclosure are defined as follows.

An undirected unweighted graph is $\mathcal{G}=(\mathcal{V},\varepsilon)$, and the number of nodes is $N=|\mathcal{V}|$. The adjacency matrix of the graph is defined as A, a degree matrix thereof is defined as D, and the feature matrix thereof is defined as N×D matrix X. Furthermore, a potential random variable N×F matrix Z is further introduced.

Taking the graph node classification task as an example, the problem is defined as follows:

Input: graph data: $\mathcal{G}=(\mathcal{V},\varepsilon)$, X, A, D. The divided node index information: {$idx_{train}$, $idx_{val}$, $idx_{test}$}.

Intermediate result: the anomaly detector is obtained by training the graph data, and a detection result linkpred is obtained by global prediction using the anomaly detector. Combined with linkpred training, the graph neural network model is obtained.

Output: the graph neural network model is used to generate the feature vectors of graph nodes, and the node labels are predicted according to the feature vectors of nodes.

Figure 1:
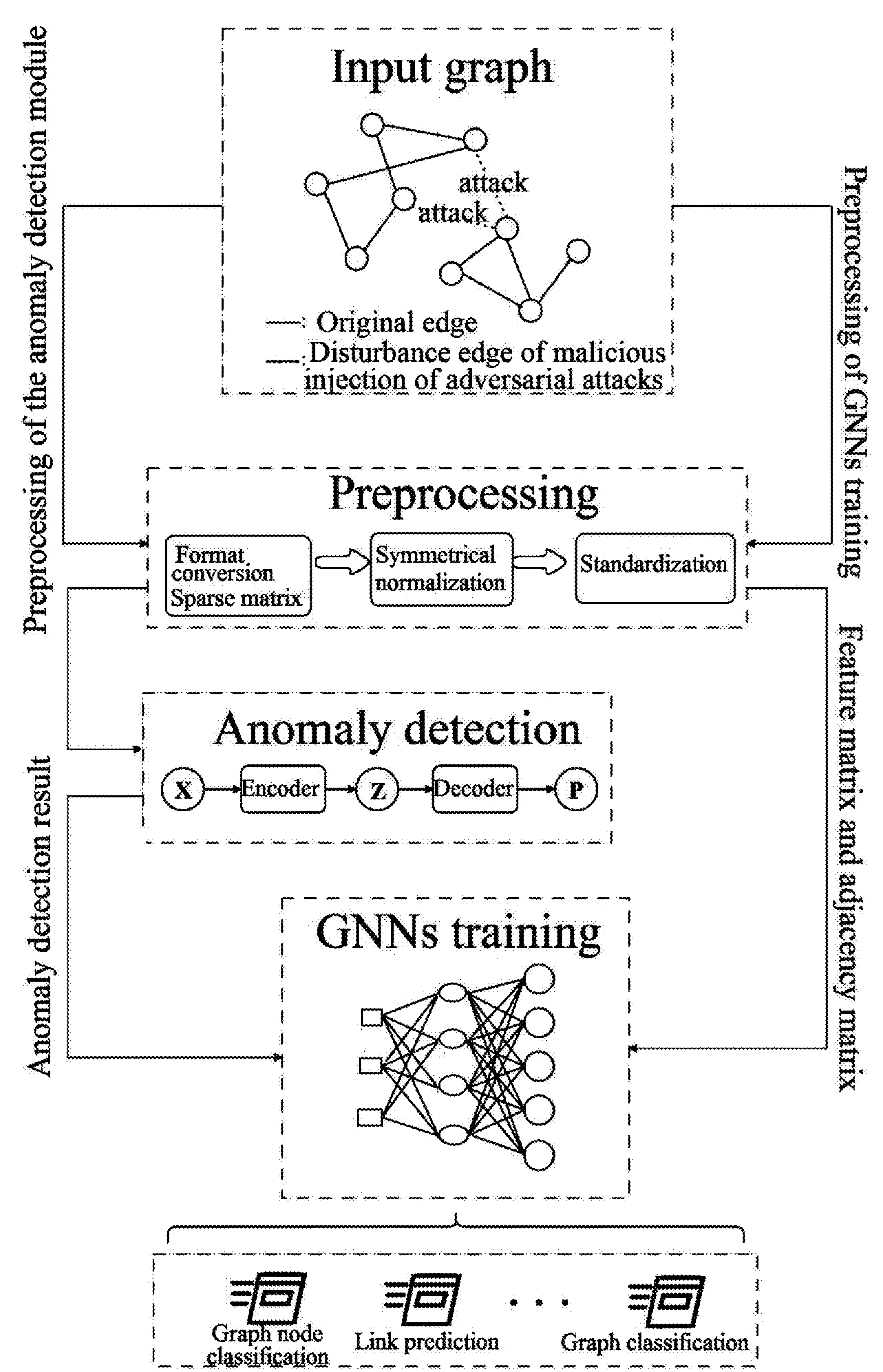
FIG. 1 is a system architecture diagram of a graph defense method according to the present disclosure.

The present disclosure uses the defense idea of graph purification and integrates anomaly detection, and mainly includes three modules. The preprocessing module performs preprocessing on the feature matrix and the adjacency matrix of the graph. The anomaly detection module optimizes the structure information of the graph data through the detection results of the graph structure by the anomaly detector. The GNNs training module uses a multi-head attention mechanism and passes a message based on the optimized graph structure purification attention coefficient, which is more interpretable than other graph purification defense models. The overall system architecture of the defense method is described based on the above modules as shown in FIG. 1.

Specifically, the graph data is passed into the anomaly detection module after being preprocessed, such as sparse matrix format conversion and normalization. The anomaly detection module is used to detect potential abnormal edges, that is, a low confidence edge set. Considering that most adversarial attacks against graph data tend to maliciously modify the graph structure, especially maliciously add edges, and the essence of the link prediction model is also the probability prediction of edge sets, the link prediction model is used as the anomaly detector in this embodiment.

Figure 2:
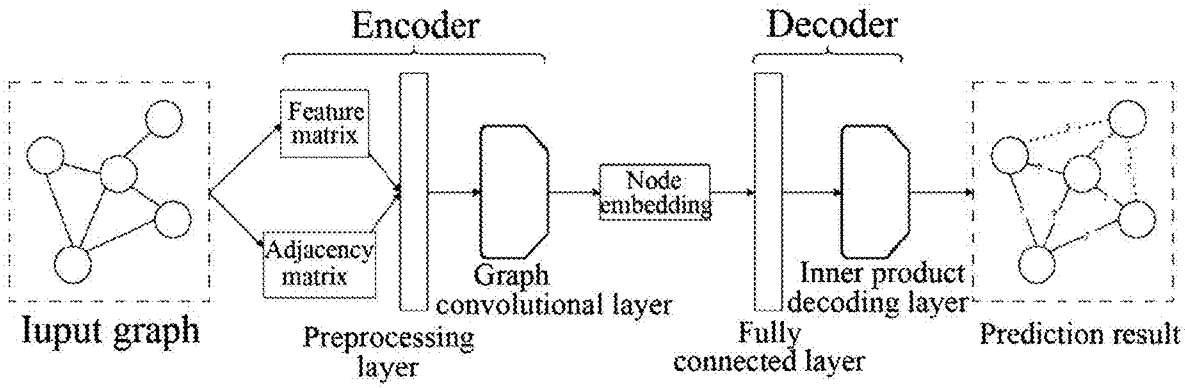
FIG. 2 is an anomaly detection module structure according to the present disclosure.

It should be noted that the anomaly detector is independent of the subsequent GNNs model, that is, the anomaly detection module is trained separately. The anomaly detector includes a graph convolution network encoder and an inner product decoder. The structural diagram of the above anomaly detection module is shown in FIG. 2, in which the encoder can be expressed as the following formula:

$$q(Z \mid X, A) = \prod_{i=1}^{N} q(z_i \mid X, A), \text{ with } q(z_i|X, A) = \mathcal{N}\left(z_i|\mu_i, \operatorname{diag}(\sigma_i^2)\right);$$

where $\mu=GCN_\mu(X, A)$ refers to the matrix of a mean vector $\mu_i$, similarly, $\log \sigma=GCN_\sigma(X, A)$. Both the vector $\mu$ and the vector $\sigma$ are obtained by averaging the feature matrix and the adjacency matrix through a double-layer GCN. The double-layer GCN can be defined as $GCN(X,A)=\tilde{A}\ ReLU(\tilde{A}XW_0)\ W_1$, where $W_0$ and $W_1$ are a first-layer weight matrix and a second-layer weight matrix of the GCN, and the vector $\mu$ and the vector $\sigma$ share the first-layer weight matrix. The ReLU function is the activation function for non-linearization.

$$\tilde{A} = D^{-\frac{1}{2}} A D^{-\frac{1}{2}}$$

is a symmetric normalized adjacency matrix. The symmetric normalization of the adjacency matrix A is used to eliminate the directionality of edges, stabilize training and improve the generalization ability of the model, while retaining the local structure information to capture the relationship between nodes in the graph more accurately. The feature matrix X and the adjacency matrix A are encoded by the double-layer GCN to obtain the intermediate feature vector, that is, the potential random variable Z. After encoding, the inner product decoder is used for decoding, and the decoder is defined as follows:

$$p(A|Z) = \prod_{i=1}^{N} \prod_{j=1}^{N} p(A_{ij}|z_i, z_j), \text{ with } p(A_{ij} = 1|z_i, z_j) = \sigma(z_i^T z_j);$$

an inner product is directly carried out based on Z obtained by encoding for decoding, where $A_{ij}$ is an element of the adjacency matrix A, which refers to the decoded value of the edge between node i and node j, and $\sigma(\bullet)$ refers to a sigmoid function.

The convolutional network encoder and the inner product decoder of the graph data of the feature matrix X and the adjacency matrix A are used to obtain the linkpred matrix as an anomaly detection result.

Furthermore, global prediction is carried out on the graph data by using the trained anomaly detector AD to obtain a linkpred matrix with the shape of (N, N), where N is the number of nodes of the input graph. The entire anomaly detection module can be defined as the following formula:

$$\text{linkpred}=\text{AnomalyDetect}(X,A).$$

After obtaining the linkpred matrix, the linkpred matrix, the feature matrix X and the adjacency matrix A are input into GNNs for training.

Figure 3:
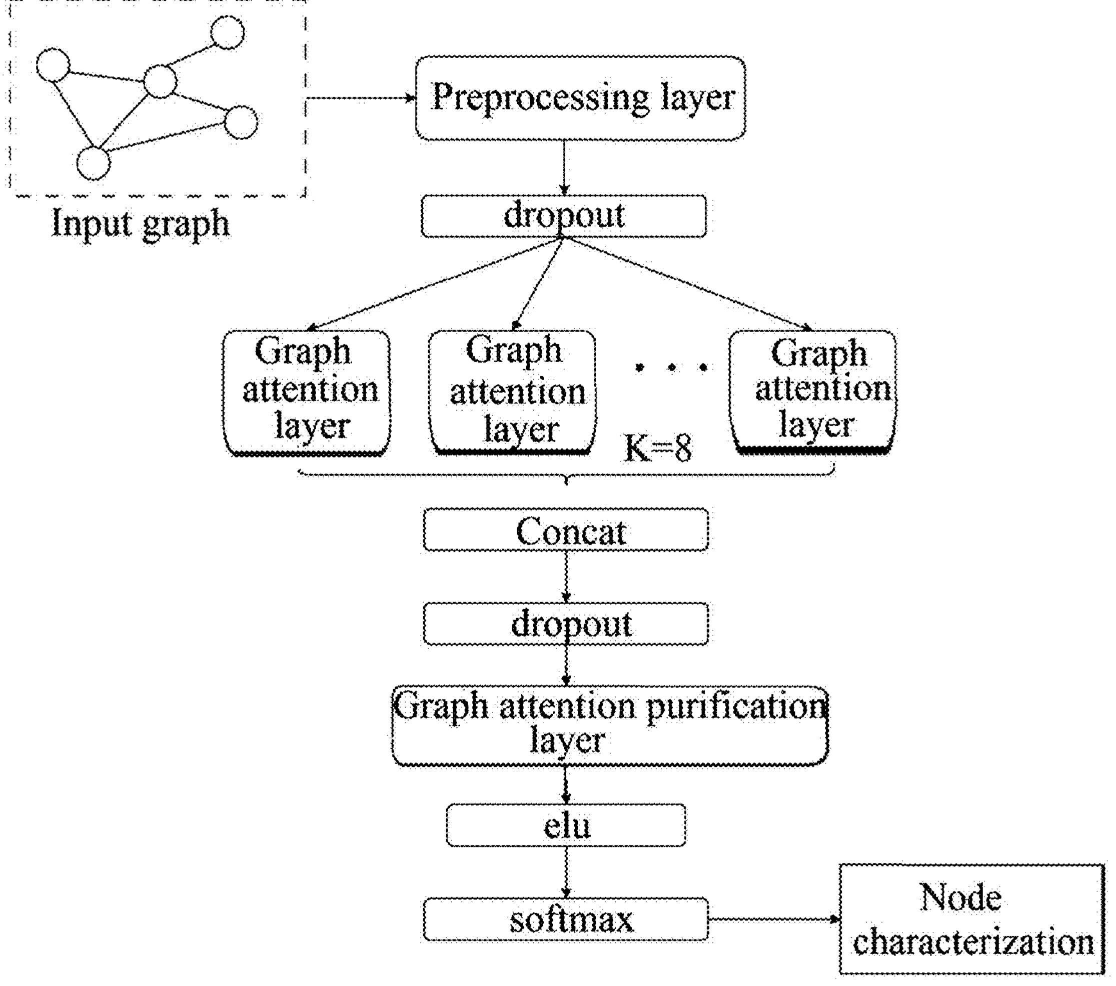
FIG. 3 is an ADGAT model network structure according to the present disclosure.

In this embodiment, the ADGAT model is selected as the GNNs. The network structure of the entire ADGAT model is shown in FIG. 3, starting from describing a single graph attention layer. The input of the layer is a set of node features $$h = \langle \vec{h}_1, \vec{h}_2, \ldots, \vec{h}_N \rangle, \vec{h}_i \in \mathbb{R}^F,$$

the output of the layer is a new set of node features $$h' = \langle \vec{h}'_1, \vec{h}'_2, \ldots, \vec{h}'_N \rangle, \vec{h}'_i \in \mathbb{R}^{F'},$$

and the node feature dimension may change.

It can be appreciated that, in order to enhance the representation level of node features to improve the fitting ability of the ADGAT model, at least a learnable linear transformation weight matrix W is introduced into the node features when calculating the attention coefficient. For this purpose, as an initial step, the node features apply the weight matrix W to share the linear transformation, and then carry out the self-attention mechanism to calculate the preliminary attention coefficient, which is as described below:

$$e_{ij}=a(W\vec{h}_i, W\vec{h}_j).$$

The attention coefficient $e_{ij}$ preliminarily obtained reflects the importance of the feature of node j to node i, where $a(\bullet)$ refers to a self-attention mechanism method, which is used for the feature aggregation of node i in the process of passing the message by allocating the attention of first-order neighbor nodes. In order to make it easier to compare $e_{ij}$ between different nodes, the softmax function is normalized on coefficients of all first-order neighbor nodes j, which is defined as $\alpha_{ij}=\text{softmax}(e_{ij})$. At the same time, the LeakyReLU activation function with negative slope $\alpha=0.2$ is introduced for nonlinearization. The specific expansion of $\alpha_{ij}$ can be described as the following formula:

$$\alpha_{ij} = \frac{\exp\left(\text{Leaky}ReLU\left(\vec{a}^T\left[W\vec{h}_i \| W\vec{h}_j\right]\right)\right)}{\sum_{k\in N_i} \exp\left(\text{Leaky}ReLU\left(\vec{a}^T\left[W\vec{h}_i \| W\vec{h}_j\right]\right)\right)}.$$

Attention purification is further performed after obtaining the preliminary attention coefficient $\alpha_{ij}$. The low confidence edge set, the common confidence edge set and the high confidence edge set corresponding to the edge cluster $\{Edge_1, Edge_2, Edge_3\}$ are divided according to the linkpred of the anomaly detection result.

For different edge sets, the operations of weakening the attention or enhancing the attention are carried out, respectively, wherein the definition of the attention purification mechanism can be described as follows:

$$\begin{cases} \alpha_{ij} = \text{attention\_increase}(\alpha_{ij}) & E_{ij} \in \text{Edge}_1 \\ \alpha_{ij} = \text{attention\_norm}(\alpha_{ij}) & E_{ij} \in \text{Edge}_2 \\ \alpha_{ij} = \text{attention\_decrease}(\alpha_{ij}) & E_{ij} \in \text{Edge}_3 \end{cases};$$

Specifically, for the low confidence edge set, the attention coefficient $\alpha_{ij}$ is set to the minimum value −9e15. This will make the attention matrix pull the attention coefficient back to the interval 0 after passing through the softmax layer, thus ignoring the influence factors of the low confidence edge set in the process of passing the message and defending against the threat of potential abnormal edges. The high confidence edge set can be regarded as the clean edge of the original structure or even the better solution of the original structure, and its attention coefficient is expanded by five times to improve its influence factor in the process of passing the message and promote the representation level of learned node features. The common confidence edge set is not processed and the original attention coefficient is maintained.

Based on the attention coefficient matrix obtained after attention purification, the process of passing the message of the ADGAT model is executed. Therefore, the output features of a single graph attention layer can be finally defined as:

$$\vec{h}_i' = \sigma\left(\sum_{j \in N_i} \alpha_{ij} W \vec{h}_j\right).$$

In order to stabilize the process of the self-attention learning mechanism, the self-attention learning mechanism is further extended to a multi-head attention mechanism. K independent attention heads are set to carry out the same hidden layer feature transformation, then the features of K heads are spliced, and the spliced hidden layer feature can be defined as:

$$\vec{h}_i' = Concat\left(\sigma\left(\sum_{j \in N_i} \alpha_{ij}^k W^k \vec{h}_j\right)\right);$$

where Concat(•) is a splicing function of K attention heads. It should be noted that the last hidden layer should be regarded as the prediction layer, so that the average processing is used for the last hidden layer feature instead of continuing to use splicing, which can be specifically defined as:

$$\vec{h}_i' = \sigma\left(\frac{1}{K}\sum_{k=1}^{K} \sum_{j \in N_i} \alpha_{ij}^k W^k \vec{h}_j\right).$$

The method of the present disclosure is applied to the graph node classification task on three real world citation network graph data such as cora and citeseer. The graph node classification is the most core task type in the downstream tasks in the graph field. Specifically, it means that graph nodes of unknown categories in the graph, that is, graph nodes to be predicted, are assigned to predefined categories in the known graph training data based on the node features and the connection relationship between nodes, thereby achieving the predicted classification.

Specifically, cora is taken as an example to describe the graph node classification. The Cora dataset represents the citations between several scientific papers and contains 2,708 papers with 5,429 citations. Here, each paper is regarded as a graph node, and each citation is regarded as an edge on the graph, so Cora can be regarded as a citation network graph. Each paper is a sample point, and all sample points fall into seven categories: case-based, Genetic algorithm, neural network, probabilistic method, reinforcement learning, rule learning, and theory.

Each paper in the dataset is described by a word vector with a value of 0/1, and the dictionary consists of 1433 unique words, i.e. the initial feature dimension of the graph node is 1433, and the feature value is only made up of 0/1. Therefore, the shape of the feature matrix in the input parameter is (2708,1433) and the adjacency matrix is (2708, 2708). The feature matrix, adjacency matrix, and other required parameters are passed through three modules to generate the final hidden layer features of each node, and the category prediction is performed using this as the graph node representation. Specifically, the output dimension is equal to the number of categories of the classification task, which is equal to 7 in the Cora dataset. The normalization process has been done here, so the category represented by the same index with the largest eigenvalue is the prediction category. For example, a graph node is characterized as $\vec{h}'_i$=<0.24,0.18,0.31,0.44,0.84,0.22,0.39>, the subscript index of the maximum value 0.84 is 4(counting from 0), and the class represented is "reinforcement learning", so the paper corresponding to the graph node is finally predicted to belong to the field of "reinforcement learning".

The present disclosure is designed to defend against potential disturbance in the task, enabling the model to produce more robust representations of graph nodes. In practice, the graph training data of the model may have unknown malicious disturbance, which will affect the model training to produce low-quality representation vectors, and eventually get a lot of wrong classification. The present disclosure detects the effectiveness of the proposed defense method by generating structural disturbances of different degrees based on metattack attacks. Note that the malicious disturbance information is invisible to the model. On cora data set, GNNs with no defense capability are greatly affected by malicious disturbance, and nearly 30% of classification accuracy is lost under severe perturbations (ptb=25%). After the above process, ADGAT can control the loss accuracy within 10% based on the prediction classification. At the same time, compared with advanced defense models such as Pro-GNN and AirGNN, ADGAT can improve the classification accuracy by about 1%~3% under the same disturbance degree.

Figure 4:
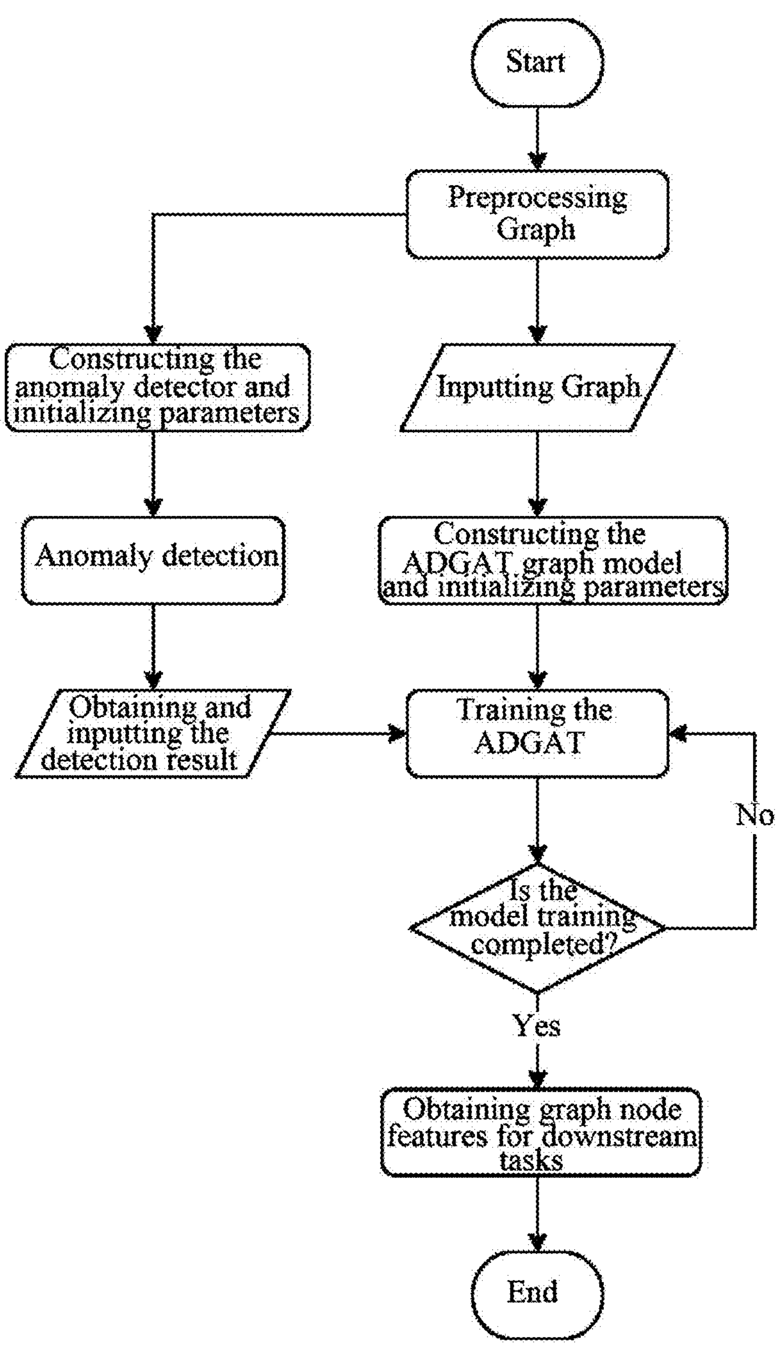
FIG. 4 is a flowchart of a graph defense method according to the present disclosure.

The above is the research idea of the present disclosure. To sum up, the graph data is first detected by the anomaly detection module, and the prediction probability matrix of linkpred is obtained. Thereafter, the parameters are input into GNNs, and the features of graph nodes are generated through several rounds of training iterations, which are used for the execution of subsequent graph tasks. The flow chart of the entire graph defense method is shown in FIG. 4.

The above is the implementation process of the present disclosure. All changes made according to the technology of the present disclosure belong to the scope of protection of the present disclosure when the generated functions are not beyond the scope of the technical scheme of the present disclosure.

What is claimed is:

1. An anomaly detection-based attention purification graph defense method, comprising:

S1: constructing and training an anomaly detector wherein the anomaly detector uses a graph link prediction model, training the anomaly detector comprises: passing graph data into the graph link prediction model for training to obtain an anomaly detector AD, wherein the graph data comprises an undirected unweighted graph $\mathcal{G}=(\mathcal{V}, \varepsilon)$, wherein an adjacency matrix is A, a degree matrix is D and a feature matrix is N×D matrix X; wherein $\mathcal{G}$ represents the undirected unweighted graph, $\mathcal{V}$ represents a set of nodes, ε represents a set of edges, and N is a number of nodes of an input graph;

S2: performing global prediction on the graph data by using the trained anomaly detector AD to obtain a linkpred matrix;

S3: inputting the linkpred matrix into a sigmoid function for normalization, and scaling element values of the linkpred matrix to an interval of [0, 1] as detection probability;

S4: training an Anomaly Detection-based Graph Attention Network (ADGAT) model

S4-1: first, preprocessing the feature matrix X and the adjacency matrix A of a graph, unifying X and A as sparse matrices, normalizing X in rows, normalizing A symmetrically, thereafter, standardizing the values of X and A, finally, converting formats of X and A from the sparse matrices into tensors which are named as feature and adj parameters, respectively, and then passing the linkpred matrix, feature and adj into the ADGAT model;

S4-2: in training process, according to the detection probability in the linkpred matrix, dividing three edge clusters $\{Edge_1, Edge_2, Edge_3\}$ as a low confidence edge set, a common confidence edge set and a high confidence edge set respectively, and performing an attention purification operation on different edge clusters to obtain a purified attention coefficient;

S4-3: passing a message based on the purified attention coefficient, and obtaining a final hidden layer feature through iteration; and

S5: using the final hidden layer feature to perform a graph node classification for assigning graph nodes of unknown categories in the graph to a predefined category.

2. The anomaly detection-based attention purification graph defense method according to claim 1, wherein the graph link prediction model uses a Variational Graph Auto-Encoder (VGAE) model.

3. The anomaly detection-based attention purification graph defense method according to claim 2, wherein the VGAE model comprises a graph convolution network encoder and an inner product decoder.

4. The anomaly detection-based attention purification graph defense method according to claim 1, wherein dividing the three edge clusters $\{Edge_1, Edge_2, Edge_3\}$ comprises:

the low confidence edge set comprising edges whose detection probability of $linkpred_{ij}$ is lower than 0.8, which are regarded as potential abnormal edges;

the common confidence edge set comprising edges whose detection probability of $linkpred_{ij}$ is between 0.8 and 0.9 inclusive, which are regarded as normal edges; and the high confidence edge set comprising edges whose detection probability of $linkpred_{ij}$ is higher than 0.9, which are regarded as clean edges.

5. The anomaly detection-based attention purification graph defense method according to claim 4, wherein Step S4-2 comprises:

performing a self-attention mechanism to calculate a preliminary attention coefficient with the following expression:

$$e_{ij}=a(W\vec{h}_i, W\vec{h}_j);$$

wherein the calculated preliminary attention coefficient $e_{ij}$ reflects the importance of node j to node i, a(•) is a self-attention mechanism method, $\vec{h}_i$ and $\vec{h}_j$ represent hidden layer features of node i and node j, respectively, and W is a trainable weight matrix, which is used for a linear change of hidden layer features to improve fitting ability of a model;

normalizing coefficients of all first-order neighbor nodes j with a softmax function, which is defined as $\alpha_{ij}$=softmax ($e_{ij}$), and at the same time, introducing a LeakyReLU activation function with a negative slope α=0.2 for nonlinearization;

further performing attention purification mechanism after obtaining the normalized attention coefficient $\alpha_{ij}$, and dividing the low confidence edge set, the common confidence edge set and the high confidence edge set corresponding to the edge clusters $\{Edge_1, Edge_2, Edge_3\}$ according to the linkpred matrix of an anomaly detection result;

for different edge sets, performing the operations of weakening the attention or enhancing the attention, respectively, wherein the definition of the attention purification mechanism is described as follows:

for each edge in the low confidence edge set, setting $\alpha_{ij}$ to −9e15;

for each edge in the common confidence edge set, keeping $\alpha_{ij}$ unchanged; and for each edge in the high confidence edge set, multiplying $\alpha_{ij}$ by 5.

6. The anomaly detection-based attention purification graph defense method according to claim 1, wherein training the anomaly detector is as follows:

an encoder is expressed as the following formula:

$$q(Z|X, A)=\prod_{i=1}^{N} q(z_i|X, A), \text{ with } q(z_i|X, A)=\mathcal{N}(z_i|\mu_i, \text{diag}(\sigma_i^2));$$

wherein, Z is an intermediate feature vector obtained by encoding X and A, and the encoder uses a double-layer Graph Convolutional Network (GCN), in which q(•) and (•) specifically use GCN for reasoning, $\mu=GCN_\mu(X, A)$ specifically refers to a matrix of a mean vector $\mu_i$, and log $\sigma=GCN_\sigma(X, A)$, both the vector μ and the vector σ are obtained by averaging X and A through the double-layer GCN, in which the double-layer GCN is defined as GCN (X, A)=$\tilde{A}$ ReLU($\tilde{A}XW_0$) $W_1$, where $W_0$ and $W_1$ are a first-layer weight matrix and a second-layer weight matrix of the GCN, and the vector μ and the vector σ share the first-layer weight matrix, and $$\tilde{A}=D^{-\frac{1}{2}}AD^{-\frac{1}{2}}$$

is a symmetric normalized adjacency matrix;

after encoding, an inner product decoder is used for decoding, wherein the inner product decoder is defined as follows:

$$q(Z|X, A) = \prod_{i=1}^{N} \prod_{j=1}^{N} p(A_{i,}|z_i, z_j), \text{ with } p(A_{ij} = 1|z_i, z_j) = \sigma(z_i^T z_j);$$

wherein, an inner product is directly carried out based on Z obtained by encoding for decoding, wherein $A_{ij}$ is an element of the adjacency matrix A, which refers to a decoded value of the edge between node i and node j, and σ(•) refers to a sigmoid function; and wherein p represents an decoding process of the decoder and q represents an encoding process of the encoder.

7. The anomaly detection-based attention purification graph defense method according to claim 5, wherein passing the message in step S4-3 comprises:

defining an output feature of an attention layer of a single graph in the ADGAT model as:

$$\vec{h}_i' = \sigma\left(\sum_{j \in N_i} \alpha_{ij} W \vec{h}_j\right);$$

further extending the output feature to a multi-head attention mechanism, setting K independent attention heads to carry out a same hidden layer feature transformation, and then splicing features of K heads, in which the spliced hidden layer feature is defined as:

$$\vec{h}_i' = Concat\left(\sigma\left(\sum_{j \in N_i} \alpha_{ij}^k W^k \vec{h}_j\right)\right);$$

where Concat(•) is a splicing function of K attention heads;

regarding a last hidden layer as a prediction layer, and using average processing for a last hidden layer feature, which is specifically defined as:

$$\vec{h}_i' = \sigma\left(\frac{1}{K} \sum_{k=1}^{K} \sum_{j \in N_i} \alpha_{ij}^k W^k \vec{h}_j\right).$$

* * * * *